United States Patent [19]

Yamada et al.

[11] Patent Number: 4,610,858

[45] Date of Patent: Sep. 9, 1986

[54] CHLOROSILANE DISPROPORTIONATION CATALYST AND METHOD FOR PRODUCING A SILANE COMPOUND BY MEANS OF THE CATALYST

[75] Inventors: Mitsunori Yamada, Omi; Masaji Ishii, Tokyo; Akira Miyai, Machida; Yukihiko Nakajima, Atsugi; Shinsei Sato, Yamato, all of Japan

[73] Assignee: Denki Kagaku Kogyo Kabushiki Kaisha, Tokyo, Japan

[21] Appl. No.: 713,901

[22] Filed: Mar. 20, 1985

[30] Foreign Application Priority Data

Apr. 6, 1984 [JP] Japan .................................. 59-67488
Apr. 6, 1984 [JP] Japan .................................. 59-67490

[51] Int. Cl.$^4$ .................... C01B 33/04; C01B 33/107
[52] U.S. Cl. .................................. 423/342; 423/347; 502/167
[58] Field of Search .............................. 423/342, 347

[56] References Cited

U.S. PATENT DOCUMENTS

| | | | |
|---|---|---|---|
| 2,834,648 | 5/1958 | Bailey et al. | 423/342 |
| 4,018,871 | 4/1977 | Marin et al. | 423/342 |
| 4,113,845 | 9/1978 | Litteral | 423/342 |
| 4,395,389 | 7/1983 | Seth | 423/347 X |

Primary Examiner—Patrick P. Garvin
Attorney, Agent, or Firm—Oblon, Fisher, Spivak, McClelland & Maier

[57] ABSTRACT

A chlorosilane disproportionation catalyst comprising a tertiary amine of the formula:

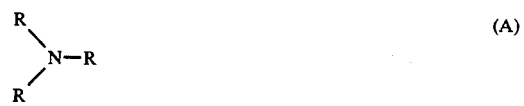

(A)

where each R represents an aliphatic hydrocarbon group and the sum of carbon atoms in the three aliphatic hydrocarbon groups as R is 12 or more, and a tertiary amine hydrochloride of the formula:

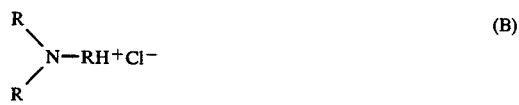

(B)

where R is as defined above.

8 Claims, 4 Drawing Figures

CHLOROSILANE DISPROPORTIONATION CATALYST AND METHOD FOR PRODUCING A SILANE COMPOUND BY MEANS OF THE CATALYST

BACKGROUND OF THE INVENTION

1. Field of the Invention

The present invention relates to a chlorosilane disproportionation catalyst and a method for producing a silane compound by means of the catalyst. More particularly, the present invention relates to a chlorosilane disproportionation catalyst comprising a specific tertiary amine and a hydrochloride thereof as the main components, and a method for continuously producing a silane compound such as dichlorosilane, monochlorosilane or monosilane, by supplying a starting material chlorosilane and the catalyst into a reaction tower, whereby the disproportionation reaction by means of the specific catalyst and the separation by distillation are conducted simultaneously. Further, the present invention relates to a process for producing a silane compound efficiently by combining a process for synthesizing trichlorosilane from silicon of metallurgical grade or silicon tetrachloride, with the above method for producing a silane compound.

2. Description of the Prior Art

Demands for silane compounds such as dichlorosilane (SiH$_2$Cl$_2$), monochlorosilane (SiH$_3$Cl) and monosilane (SiH$_4$) are expected to increase more and more as they are useful as the raw materials for the high purity silicon to be used for elements for semiconductors, solar cells, etc. In particular, it has been desired that dichlorosilane and monosilane be produced efficiently and in a large quantity.

It is known to obtain a silane by the disproportionation reaction of SiHCl$_3$ in the presence of a catalyst, in accordance with the following equilibrium reactions.

$$2SiHCl_3 \rightleftharpoons SiH_2Cl_2 + SiCl_4 \quad (1)$$

$$2SiH_2Cl_2 \rightleftharpoons SiHCl_3 + SiH_3Cl \quad (2)$$

$$2SiH_3Cl \rightleftharpoons SiH_4 + SiH_2Cl_2 \quad (3)$$

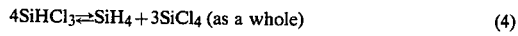

$$4SiHCl_3 \rightleftharpoons SiH_4 + 3SiCl_4 \text{ (as a whole)} \quad (4)$$

The disproportionation of chlorosilanes has been studied since old, and various proposals have been made. However, they still have disadvantages. For example, (i) the method of using nitriles as taught in U.S. Pat. No. 2,732,282 has to be conducted at a reaction temperature of 150° C. and above; (ii) the method of using aliphatic cyanamides as taught in U.S. Pat. No. 2,732,280 requires the pretreatment with a Lewis acid; (iii) the method of using dimethylformamide or dimethylbutylamide as taught in U.S. Pat. No. 3,222,511 is liable to deteriorate the catalyst used for the reaction; and (iv) the method of using a tertiary amine containing a hydrocarbon composed of an alkyl group with 1 or 2 carbon atoms, as taught in U.S. Pat. No. 2,834,648 is required to be conducted at a temperature of 150° C. and above, as is the case with the catalyst of the above-mentioned method (i), besides which a pressure resistant vessel has to be used, and, in spite of its equilibrated conversion ratio (calculated value) being 18% at the reaction temperature of 150° C., the actual conversion ratio is as low as about 10%, hence a large size apparatus is required to attain a desired quantity of production.

Further, U.S. Pat. No. 4,113,845 discloses use of a fixed bed type reactor packed with an anion exchange resin containing a tertiary amine as the catalyst, wherein a starting material chlorosilane such as trichlorosilane or dichlorosilane is supplied in a liquid state from one port of the reactor and reacted at a temperature of from 30° to 200° C. under a pressure of from 1 to 30 atm, whereby a reaction product comprising monosilane, monochlorosilane, dichlorosilane, trichlorosilane and silicon tetrachloride is obtainable from the other port of the reactor. However, since the above-mentioned equations (1), (2) and (3) for the disproportionation reaction are equilibrium reactions, it is not possible to complete the reaction of the starting material chlorosilane 100%, even if the reaction is conducted for an extended period of time. For example, the following Table indicates the equilibrated composition of monosilane, monochlorosilane, dichlorosilane, trichlorosilane and silicon tetrachloride at a temperature of 80° C. when the disproportionation reaction of trichlorosilane or dichlorosilane as the starting material has reached the state of equilibrium.

| Starting material chlorosilane | Monosilane | Monochlorosilane | Dichlorosilane | Trichlorosilane | Silicon tetrachloride |
|---|---|---|---|---|---|
| | | | | | (mole %) |
| Trichlorosilane | 0.04 | 0.52 | 10.6 | 77.1 | 11.8 |
| Dichlorosilane | 10.2 | 15.6 | 38.8 | 34.7 | 0.65 |

Further, even when the disproportionation reaction is brought to the equilibrated condition by using trichlorosilane as the starting material, monosilane and monochlorosilane contained in the reaction product are 0.04 mol % and 0.52 mol %, respectively, which figures indicate a very low reaction rate for producing monosilane or monochlorosilane in a single stage reaction. Therefore, when, for example, monosilane is produced by using trichlorosilane as the starting material, the reaction product from the reaction vessel at the first stage is charged in a distilling device to separate a mixture containing therein monosilane, monochlorosilane, and dichlorosilane, wherein dichlorosilane is the principal component (composition A) and a mixture of trichlorosilane and silicon tetrachloride (composition B), and then the composition A is fed into the reaction vessel at the second stage, whereupon, since the equilibrated composition from the disproportionation reaction contains 10.2 mol % of monosilane, as is apparent from the table, monosilane can be separated and recovered by feeding this reaction product into the distilling apparatus. However, since the rate of reaction in the disproportionation reaction is low, the unreacted substance should be circulated in a large quantity for use, with the consequence that enormous amount of energy was disadvantageously required for the operations of the reaction vessel and the distilling tower.

Furthermore, N-methyl-2-pyrrolidone, methylimidazole, tetramethylurea, tetramethylguanidine, trimethylsilylimidazole, benzothiazole, N,N-dimethylacetamide and the like, as disclosed e.g. U.S. Pat. Nos. 4,018,871 and 4,038,371 or Japanese Unexamined Patent Publication No. 17918/1981, exhibit catalytic activities in the disproportionation reaction of silane compounds. However, they are per se solid, or become powdery solid when brought in contact with a silane compound such as trichlorosilane or dichlorosilane. Consequently, it becomes difficult to separate them from the silane compound produced by the disproportionation reaction. Thus, they are hardly applicable to a practical operation on an industrial scale.

SUMMARY OF THE INVENTION

It is an object of the present invention to provide a chlorosilane disproportionation catalyst whereby a disproportionation reaction can be completed in a short period of time at a low temperature with a high conversion, by using a specific tertiary amine and a hydrochloride thereof as the disproportionation catalyst.

A second object of the present invention is to provide a method for continuously producing a silane compound such as monosilane, monochlorosilane or dichlorosilane from a starting material chlorosilane such as trichlorosilane.

A third object of the present invention is to reuse silicon tetrachloride formed as a by-product by the disproportionation reaction. As shown in the foregoing equation (4), when 1 mol of $SiH_4$ is produced by the disproportionation reaction, 3 mol of $SiCl_4$ is obtained as a by-product. In terms of weight, 17 kg of $SiCl_4$ is produced with respect to 1 kg of $SiH_4$. When $SiH_4$ is to be obtained in a large quantity and at a low cost, this by-product $SiCl_4$ is required to be re-used.

Heretofore, in the method of using an ion-exchange resin, the by-product $SiCl_4$ is introduced into a reaction system consisting of silicon of metallurgical grade, hydrogen, and hydrogen chloride, then treated at a temperature of 600° C. or so, and re-converted to trichlorosilane ($SiHCl_3$). However, as described in the foregoing, since the reaction rate in the disproportionation reaction is low, a large amount of unreacted substance needs to be used by recycling, on account of which the reaction vessel and the distilling apparatus should be made large in scale. Thus, an enormous amount of energy is disadvantageously required.

That is to say, the third object of the present invention is to provide an integral process with the least amount of recycling of the unreacted substance and less energy consumption by use of the method according to the second object of the present invention which is excellent in the rate of disproportionation reaction, including the re-use of $SiCl_4$ as a by-product.

Namely, the present invention provides a chlorosilane disproportionation catalyst comprising a tertiary amine of the formula:

(A)

where each R represents an aliphatic hydrocarbon group and the sum of carbon atoms in the three aliphatic hydrocarbon groups as R is 12 or more, and a tertiary amine hydrochloride of the formula:

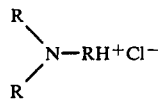
(B)

where R is as defined above.

Further, the present invention provides a method for continuously producing a silane compound such as monosilane or dichlorosilane by the disproportionation reaction of a starting material chlorosilane such as trichlorosilane, which comprises:

(a) supplying the starting material chlorosilane and the above-mentioned chlorosilane disproportionation catalyst into a reaction tower having a distilling function;

(b) obtaining, from the top of the tower, a silane compound containing more hydrogen atoms than the starting material chlorosilane;

(c) withdrawing, from the bottom of the tower, a liquid mixture comprising the catalyst and silane compounds containing more chlorine atoms as by-products;

(d) separating the silane compounds and the catalyst in the liquid mixture; and (e) recycling the separated catalyst to the reaction tower.

DETAILED DESCRIPTION OF THE INVENTION

Figure 1:
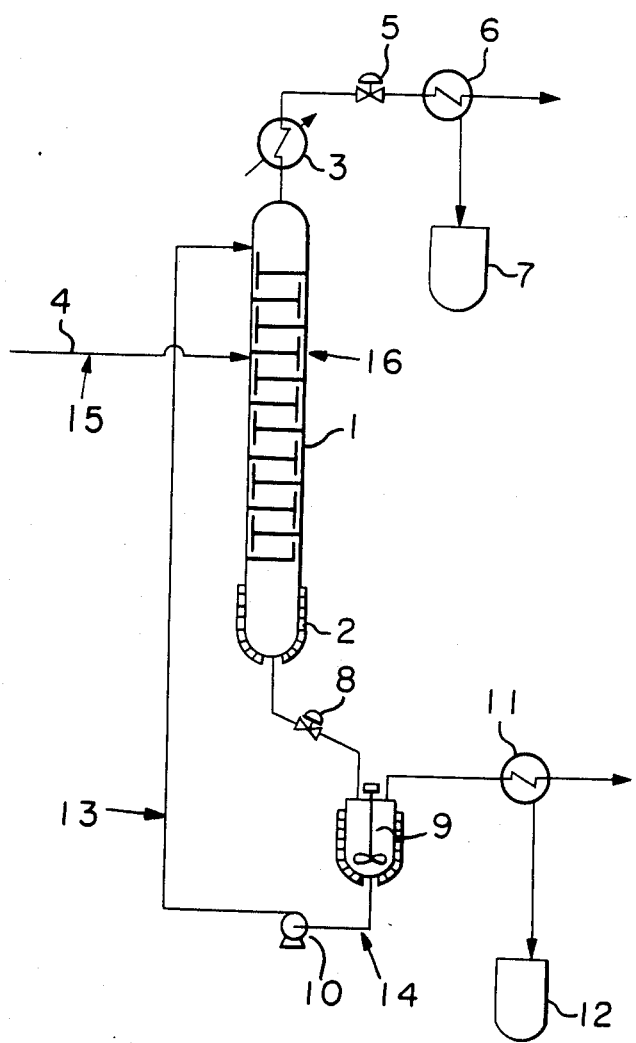
FIG. 1 is a schematic diagram illustrating an apparatus used for the production of silane compounds as described in Examples.

In the present invention, the chlorosilane is at least one chlorosilane selected from $SiHCl_3$, $SiH_2Cl_2$ and $SiH_3Cl$.

The reason why the sum of carbon atoms in the aliphatic hydrocarbon groups as R is limited to 12 or more in the present invention is that when a tertiary amine having less than 12 carbon atoms is added to the chlorosilane, white solid will form and it becomes impossible to conduct the reaction in a uniform liquid phase, and as will be apparent from Examples given hereinafter, the tertiary amine having less than 12 carbon atoms is inferior in the disproportionation reaction rate to the one having 12 or more carbon atoms. There is no particular restriction as to the upper limit of the sum of carbon atoms. However, from the viewpoints of the performance and costs, the sum of carbon atoms is preferably from 12 to 36.

As the compound of the formula (A), there may be mentioned tri-n-butylamine, tri-n-pentylamine, tri-n-hexylamine, tri-n-heptylamine, tri-n-octylamine, tri-n-decylamine and tri-n-dodecylamine.

The compound of the formula (B) is a hydrochloride of the compound represented by the formula (A) and is usually readily obtained by adding hydrochloric acid or hydrogen chloride gas to a solution of the above-mentioned tertiary amine.

When the compounds of the formulas (A) and (B) are to be used as a catalyst, the tertiary amine and its hydrochloride are preferably used in such proportions that the former constitutes from 20 to 98 mol % and the latter constitutes from 2 to 80 mol %. If the latter is less than 2 mol %, the catalytic activity is weak, and if the latter exceeds 80 mol %, hydrochloric acid is likely to be freed during the reaction, thus leading to the following reactions, whereby it becomes difficult to obtain the desired silane compound having a greater number of hydrogen atoms efficiently.

$$SiH_4 + HCl \rightarrow SiH_3Cl + H_2$$

$$SiH_3Cl + HCl \rightarrow SiH_2Cl_2 + H_2$$

$$SiH_2Cl_2 + HCl \rightarrow SiHCl_3 + H_2$$

$$SiHCl_3 + HCl \rightarrow SiCl_4 + H_2$$

It is particularly preferred that the catalyst comprises from 70 to 90 mol % of the tertiary amine of the formula (A) and from 10 to 30 mol % of the tertiary amine hydrochloride of the formula (B).

The catalyst is used preferably in an amount of from 2 to 50 mol % relative to the starting material chlorosilane.

A particularly preferred catalyst comprises from 70 to 90 mol % of tri-n-butylamine and/or tri-n-octylamine, and from 10 to 30 mol % of tri-n-butylamine hydrochloride and/or tri-n-octylamine hydrochloride.

According to the present invention as described in the foregoing, the following effects will be obtained.

(1) The catalyst of the present invention provides a conversion which is closer to the equilibrated conversion, at a temperature of less than 150° C. in comparison with the conventional catalyst.

(2) When the catalyst of the present invention is used, the equilibrated conversion is reached in a short period of time, which means a high disproportionation velocity, and which makes it possible to reduce the size of the reaction apparatus.

(3) The catalyst according to the present invention is completely soluble in the chlorosilane starting material, and also has a boiling point of 200° C. and above. Accordingly, it serves to lower the vapor pressure in the reaction liquid, and advantageously contributes to safety in the operation.

(4) The catalyst can be readily separated from the reaction product such as $SiH_2Cl_2$ or $SiH_4$.

(5) Since the reaction system is a uniform liquid phase system, there is no necessity for agitation and other homogenizing operations. Thus, the transportion and various handling of the catalyst become advantageously simple. There are of course various advantages besides the above.

Now, the method for the disproportionation of a chlorosilane by means of the catalyst of the present invention will be described. Conventional methods may be employed for the production of silane compounds such as $SiH_2Cl_2$ and $SiH_4$ by the disproportionation reaction by means of the catalyst of the present invention. For instance, there may be employed a series of operations which comprises mixing the chlorosilane and the catalyst, subjecting the mixture to the disproportionation reaction, and separating the resulting silane compounds such as $SiH_2Cl_2$ and $SiH_4$ by condensation or distillation. These operations may be carried out simultaneously. Namely, the disproportionation and/or redistribution of the present invention may be conducted by contacting the chlorosilane with the catalyst of the present invention. The reaction is conducted preferably at a temperature of from 10° to 300° C., more preferably from 20° to 150° C.

To activate and reuse the used catalyst, it is desirable to add at least one of hydrogen chloride gas, hydrochloric acid and water, to the used catalyst. Hydrogen chloride, hydrochloric acid or water may be added to a recycling line for the catalyst or directly to the reaction tower. Further, in the case of hydrogen chloride, it may be added to the line for supplying the starting material chlorosilane to the reaction tower.

The disproportionation may be conducted in a batch system or in a continuous system. However, the following continuous method is preferred.

In the method for continuously producing a silane compound such as monosilane or dichlorosilane by the disproportionation reaction of a starting material chlorosilane such as trichlorosilane, the above-mentioned catalyst of the present invention and the starting material chlorosilane were supplied to a reaction tower having a distilling function; a silane compound containing more hydrogen atoms than the starting material chlorosilane is obtained from the top of the tower, while a liquid mixture comprising the catalyst and by-product silane compounds containing more chlorine atoms, is withdrawn from the bottom of the reaction tower; then, the silane compounds and the catalyst in the above-mentioned liquid mixture, are separated; and the separated catalyst is then recycled to the reaction tower.

In this method, the reason why the sum of carbon atoms in the three aliphatic hydrocarbon groups as R of the catalyst is limited to 12 or more, is that compounds containing less than 12 carbon atoms are undesirable since they are likely to form solid substances when contacted with a silane compound such as trichlorosilane, dichlorosilane or silicon tetrachloride, although they have catalytic activities. Namely, the reaction tower to be used in the present invention is a trays tower or a packed tower having a distilling function. Accordingly, the solid substances are likely to clog the plates or the packing materials, whereby smooth continuous operation can hardly be conducted.

The sum of carbon atoms in the three aliphatic hydrocarbon groups as R of the catalyst is preferably from 12 to 36. A preferred catalyst comprises tri-n-butylamine and/or tri-n-octylamine. The most preferred catalyst is the one obtained by adding at least one member selected from the group consisting of hydrogen chloride gas, hydrochloric acid and water, to tri-n-butylamine and/or tri-n-octylamine. The amount of the addition is adjusted to bring the hydrochloride concentration in the catalyst to a level of from 2 to 80 mol %, preferably from 10 to 30 mol %.

The catalyst is used preferably in an amount of from 2 to 50 mol %, more preferably from 5 to 40 mol % relative to the starting material chlorosilane.

Now, the reaction tower to be used in the present invention will be described. The reaction tower is of a distillation tower type. For instance, it is a plate tower with its interior being partitioned by sieve trays or bubble cap trays, or a packed tower with its interior filled with packing material such as Raschig rings or pall rings. While the reaction tower may be of any structure, provided that it has a distillation function, the more desirable is a reaction tower having a large liquid holdup capacity, because the disproportionation reaction of the silane compound according to the present invention is conducted in a liquid phase. In the reaction tower according to the present invention, the separation by distillation of the reaction product is carried out simultaneously with the reaction, and accordingly the temperature at the top of the reaction tower is low, while the temperature at the bottom of the tower is high. Thus, a temperature gradient is produced within the reaction tower, whereby the reaction temperature is not constant. However, the reaction is usually conducted at a temperature of from 10° to 300° C., preferably from 20° to 150° C. If the temperature is less than 10° C., the reaction rate is low, and the disproportionation reaction does not substantially proceed. On the other hand, if the temperature exceeds 300° C., the thermal decomposition of the catalyt is likely to take place, such being undesirable. The reaction is conducted in a boiling state, and in order to keep the reaction temperature to the above-mentioned range, the gauge pressure is usually maintained at a level of from 0 to 40 kg/cm$^2$, preferably from 0 to 20 kg/cm$^2$.

When the disproportionation reaction of the starting material chlorosilane is conducted in the presence of the catalyst in the reaction tower having the distilling function, the above-mentioned disproportionation reactions (1), (2) and (3) proceed simultaneously, whereby monosilane, monochlorosilane, dichlorosilane, trichlorosilane and silicon tetrachloride will be formed. Their boiling points are −118° C., −30° C., 8° C., 32° C. and 56° C., respectively. Further, since the reaction tower per se has the distilling function, there will be a concentration distribution from the top of the tower in the sequence of monosilane, monochlorosilane, dichlorosilane, trichlorosilane and silicon tetrachloride.

Now, the method for the production of a silane compound according to the present invention will be described with reference to the drawings.

FIG. 1 is a schematic diagram illustrating the apparatus to be used in Examples of the present invention. The starting material chlorosilane such as trichlorosilane or dichlorosilane is supplied to an upper portion of the reaction tower 1 via a starting material supply line 4. The reaction tower 1 is a stainless steel distilling tower having a diameter of 83 mm and a height of 2000 mm with 18 stages. Each tray is a sieve tray having 37 perforations with a diameter of 1.5 mm. Above the tower 1, a condenser 3 made of stainless steel is provided, which is adapted to be cooled by circulating methanol dry ice in a jacket. At the lower portion of the reaction tower 1, a reboiler 2 equipped with a heater having a maximum output power of 1 KW is provided.

In the reaction tower 1, separation by distillation takes place simultaneously with the disproportionation reaction, whereby the gas rich in the low boiling point components formed by the disproportionation reaction moves upward and cooled by the condenser 3, whereby the accompanying high boiling point components will be condensed. The low boiling point components will then be condensed by a condenser 6 made of stainless steel and cooled with liquid nitrogen, and recovered in a liquid state in a collecting tank 7.

On the other hand, the high boiling point components such as trichlorosilane and silicon tetrachloride formed by the disproportionation reaction, will move to the bottom of the tower, and will then be withdrawn together with the catalyst to the evaporation tank 9 while the liquid level is controlled by the reboiler 2. The evaporation tank 9 is a stainless steel vessel having an internal capacity of 3 liters and equipped with an agitator. A jacket is provided thereon, and a heating oil is circulated in the jacket to heat the evaporation tank. This evaporation tank 9 is operated at a temperature which is higher than the boiling point of silicon tetrachloride formed by the disproportionation reaction and lower than the boiling point of the catalyst. Trichlorosilane and silicon tetrachloride withdrawn from the reboiler 2 are evaporated, collected in a condenser 11 cooled with methanol dry ice, and recovered in a tank 12. The catalyst remaining in the evaporation tank 9 is withdrawn by a pump 10 and recycled to the top of the reaction tower 1. If necessary, at least one of hydrogen chloride gas, hydrochloric acid and water is supplemented via any one of supply lines 13 to 16.

Figure 2:
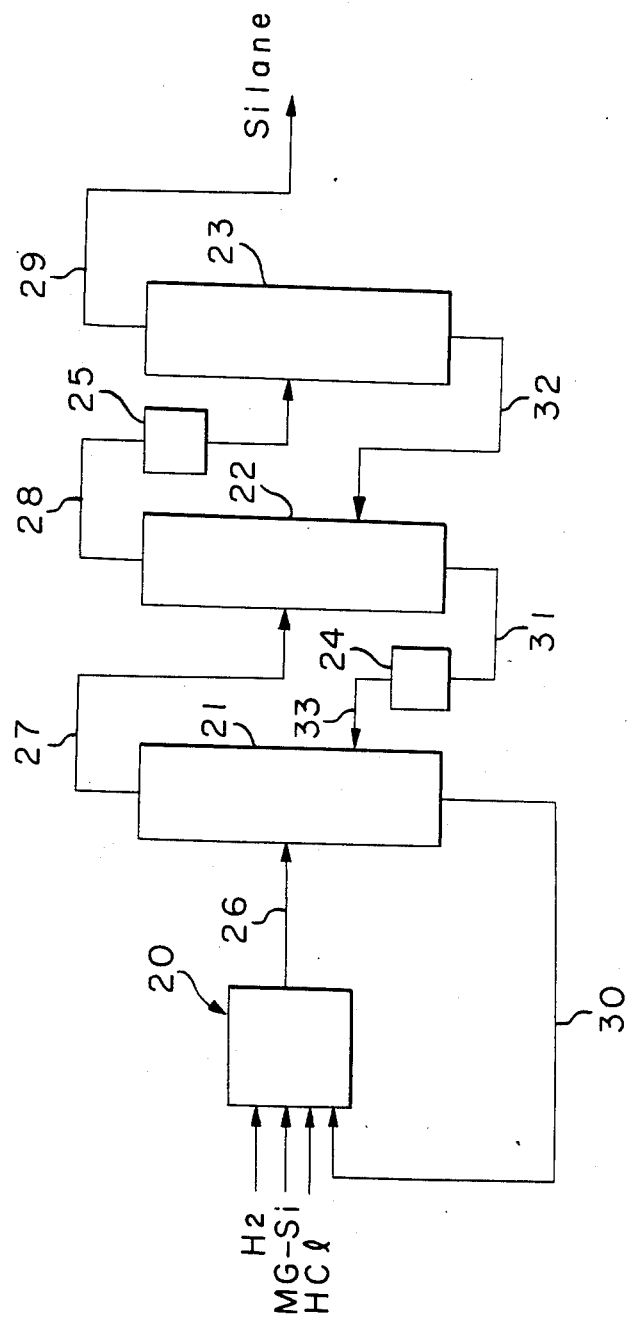
FIGS. 2 is a schematic diagram illustrating the process for the preparation of the starting material according to a Comparative Example.

For the purpose of the comparison, FIG. 2 illustrates a conventional disproportionation method wherein an ion exchange resin is employed. Referring to FIG. 2, reference numeral 20 designates a trichlorosilane synthesizing tower, from which produced gas 26, consisting principally of SiHCl$_3$ and SiCl$_4$, enters into the subsequent distilling tower 21. The principal components of the gas at the top part of the distilling tower are SiHCl$_3$ and SiH$_2$Cl$_2$ which enter further into the subsequent distilling tower 22. On the other hand, SiHCl$_3$ is taken out of the bottom part 31 of the distilling tower 22, then introduced into a disproportionation tower 24 filled with an ion-exchange resin, and disproportionated. The disproportionated mixture of silanes enters into the distilling tower 21, from the bottom part 30 of which a high boiling point substance of SiCl$_4$ is taken out and sent back to the trichlorosilane synthesizing tower 20.

On the other hand, SiH$_2$Cl$_2$ as the principal component at the top part of the distilling tower 22 enters into a disproportionation tower 25 filled with an ion-exchange resin. The silane compound as disproportionated therein is then introduced into a silane distilling tower 23, from the top 29 of which SiH$_4$ is taken out. A high boiling point component from the bottom 32 of the distilling tower 23 is returned to the distilling tower 22.

As described in the above, the conventional disproportionation process required two units of disproportionation tower and three units of the distilling tower, the total process steps for the reaction being six, including the synthesis of trichlorosilane.

In the following, explanations will be given in reference to FIG. 3 as to the disproportionation reaction according to the present invention. Referring to the flow chart in FIG. 3, a reference numeral 40 designates a trichlorosilane synthesizing vessel to carry out the first step of the hydrogenation reaction according to the present invention. Produced gas 44 contains SiHCl$_3$ and SiCl$_4$ as the principal components which are sent into a distilling tower 41 to carry out the second step of the distillation. The component at the top of the distilling tower 41 is mainly SiHCl$_3$ which is introduced into a reaction tower 43 which carries out the third step of the reaction and in which the tertiary amine and its hydrochloride are present as the catalyst. From the top of this tower 43, a mixture of silanes 49 consisting principally of SiH$_4$ is taken out, and forwarded to a silane distilling tower 42 to carry out the fifth step of the distillation, from which SiH$_4$ as the end product is taken out as the tower top component.

On the other hand, the high boiling point component in the silane distilling tower 42 is returned to the reaction and distilling tower 43. Since the high boiling point component in the reaction tower contains a mixture of silanes with SiHCl$_3$ and SiCl$_4$ as the principal components as well as the catalyst, this high boiling point component is introduced into a distilling vessel 52 to carry out the fourth step of the separation where the mixture of silanes and the catalyst are separated. The catalyst 48 is returned to the reaction tower 43, while the mixture of silanes is recycled to the distilling tower 41. SiCl$_4$ is sent back to the trichlorosilane synthesizing vessel 40.

Thus, the present invention suffices with a single unit of the reaction tower and two units of the distilling tower, and the total process steps can be five, even inclusive of the trichlorosilane synthesizing vessel and the evaporator, hence the method of the present invention provides a simplified process in comparison with the conventional method.

The operating conditions at each process step are as follows: the first step is conducted at the operating temperature of from 400° to 700° C. under a pressure range of from zero to 30 kg/cm$^2$G; the second step is carried out under a pressure in a range of from zero to 2 kg/cm$^2$G; the third step is carried out at a temperature in a range of from zero to 300° C. under a pressure range of from zero to 40 kg/cm$^2$G; the fourth step is done at a temperature in a range of from 70° to 200° C. under a pressure range of from zero to 4 kg/cm$^2$G; and the fifth step is conducted at a temperature in a range of from $-10°$ to $-40°$ C. under a pressure range of from 15 to 40 kg/cm$^2$G, although such temperature and pressure conditions depend also on the purity of SiH$_4$ as the ultimate product.

As will be described in Examples, the present invention provides a high rate of disproportionation reaction, besides the afore-described various effects, hence the recycling quantity of the unreacted substances becomes decreased with the consequent reduction in size of the distilling tower and, further, least utility, and other advantages.

In the foregoing explanations of the present invention, there has been shown a process of obtaining SiH$_4$ as the end product. It should however be noted that the same effect as mentioned above can be obtained in the case of taking out SiH$_2$Cl$_2$ as the end product.

Figure 4:
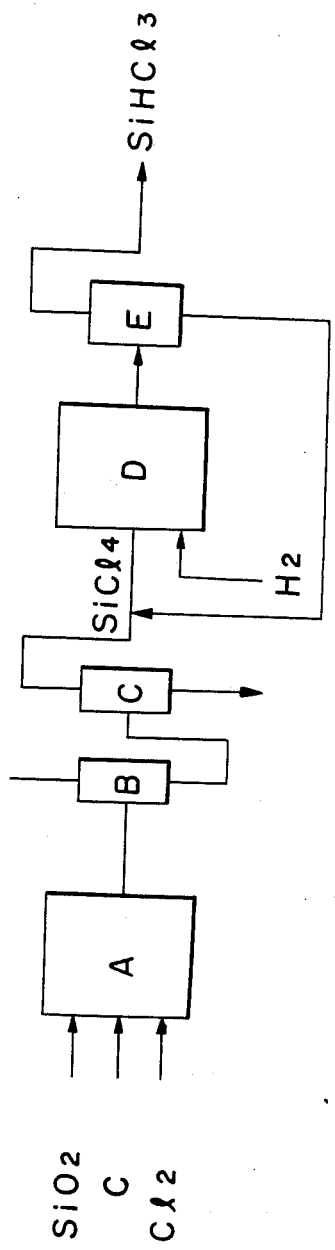

In the trichlorosilane synthesizing vessel in the first step, trichlorosilane is prepared from silicon of metallurgical grade as a starting material. Instead of this process, there may be employed a process as shown in FIG. 4 wherein silica, carbon and chlorine as starting materials are reacted at a high temperature in a silicon tetrachloride synthesizing furnace to produce silicon tetrachloride, and the silicon tetrachloride thus obtained is purified in a low boiling component removal tower B and a high boiling component removal tower C, then introduced into a trichlorosilane synthesizing tower D and converted to trichlorosilane by reduction with hydrogen. This method is advantageous in the case where silane gas is produced in a large amount, since the power consumption is thereby essentially small, and the cost for the operation is low. Here, the synthesis of silicon tetrachloride is conducted usually at a temperature of from 1100° to 1400° C. in a reaction system such as a fixed bed system, a transfer bed system or a fluidized bed system. Further, when silicon carbide is added to the starting material as a catalyst in an amount of from 1 to 10% by weight, the reaction rate is improved. Further, from the viewpoint of the efficiency of energy, the synthesis of trichlorosilane by reduction with hydrogen is advantageously conducted at a molar ratio of SiCl$_4$/H$_2$ within a range of from 1:1 to 1:2, at a temperature within a range of from 1200° to 1400° C.

Now, the present invention will be described in detail with reference to Examples. However, it should be understood that the present invention is by no means restricted by these specific Examples.

EXAMPLE 1

Using trichlorosilane (SiHCl$_3$), which was placed in an autoclave (SUS 304) of 500 cc capacity and provided with a jacket and an agitator, the disproportionation reaction was conducted in a hermetically sealed condition by varying the reaction temperature, and the kind and amount of the catalyst, as shown in Table 1 below. The quantity of the chlorosilane in the gas phase was quantitatively measured by gas chromatography time-sequentially. The amount of the hydrochloride in each case was 20 mol % relative to the tertiary amine. The hydrochloride was formed by introducing the tertiary amine into the autoclave and then blowing HCl thereinto. A change in the quantity of SiHCl$_3$ in the gas phase corresponds to its conversion ratio, and Table 1 below indicates the time until the concentration of SiHCl$_3$ takes a constant value and the concentrations of SiHCl$_3$ and SiCl$_4$ at that time. Table 1 shows that the shorter the time is, the faster is the conversion velocity (i.e. disproportionation velocity), and the lower the concentration value of SiHCl$_3$ is, the better becomes the conversion. Also, in Table 1 below, the equilibrated concentration of SiHCl$_3$ obtained by calculation is shown as a reference.

For the purpose of comparison, under the same conditions as in Example 1 above, the disproportionation reactions were carried out by using trimethylamine, triethylamine, tri-n-propylamine, trimethylamine hydrochloride, and triethylamine hydrochloride as the catalysts, at the reaction temperatures of 25° C., 50° C., and 100° C., respectively. The results are shown in Table 1 below (experiments No. 20–No. 30). The catalysts were present as solid substance in the reaction liquid, and the agitator was employed for sufficient dispersion of the catalysts.

According to the present invention as shown in Table 1, the equilibrated conversion was obtained in 38 min. and 2 min. at the respective reaction temperatures of 25° C. and 100° C. in experiments No. 8 and No. 9. In contrast to this, according to comparative experiments No. 20 and No. 22, the equilibrated conversion was not obtained even at the end of 240 min. and 10 min., respectively. This difference leads to a difference in the production quantity of SiH$_2$Cl$_2$ which amounts to 7 times and 2 times, respectively, when manufacturing SiH$_2$Cl$_2$ from SiHCl$_3$ in the reaction vessels of the same capacity. This proves that the effect to be derived from the present invention is apparently superior.

TABLE 1

| Experiment No. | Kind of catalyst | Reaction temp. (°C.) | Quantity of catalyst (mol) | Starting material SiHCl₃ (mol) | Time lapsed, until SiHCl₃ concentration becomes constant (min) | SiHCl₃ concentration when it became constant (%) | SiCl₄ concentration when it became constant (%) | Equilibrated SiHCl₄ concentration (%) |
|---|---|---|---|---|---|---|---|---|
| 1 | Tri-n-butylamine | 50 | 0.1 | 1 | 7 | 79.8 | 10.3 | 79.0 |
| 2 | Tri-n-pentylamine | 50 | 0.1 | 1 | 7 | 79.4 | 10.5 | 79.0 |
| 3 | Tri-n-hexylamine | 50 | 0.1 | 1 | 6 | 79.5 | 10.3 | 79.0 |
| 4 | Tri-n-heptylamine | 50 | 0.1 | 1 | 6 | 79.3 | 11.0 | 79.0 |
| 5 | Tri-n-octylamine | 50 | 0.1 | 1 | 6 | 79.4 | 10.9 | 79.0 |
| 6 | Tri-n-decylamine | 50 | 0.1 | 1 | 6 | 79.4 | 10.5 | 79.0 |
| 7 | Tri-n-dodecylamine | 50 | 0.1 | 1 | 6 | 79.5 | 10.2 | 79.0 |
| 8 | Tri-n-butylamine | 25 | 0.1 | 1 | 38 | 80.2 | 11.5 | 80.0 |
| 9 | Tri-n-butylamine | 100 | 0.1 | 1 | 2 | 76.0 | 13.6 | 76.0 |
| 10 | Tri-n-butylamine | 150 | 0.1 | 1 | 1.5 | 74.5 | 14.4 | 74.0 |
| 11 | Tri-n-octylamine | 25 | 0.1 | 1 | 25 | 80.5 | 10.5 | 80.0 |
| 12 | Tri-n-octylamine | 100 | 0.1 | 1 | 2 | 76.2 | 12.8 | 76.0 |
| 13 | Tri-n-octylamine | 150 | 0.1 | 1 | 1.5 | 74.5 | 14.4 | 74.0 |
| 14 | Tri-n-butylamine | 50 | 0.04 | 1 | 55 | 85.8 | 7.1 | 79.0 |
| 15 | Tri-n-butylamine | 50 | 0.05 | 1 | 30 | 81.0 | 10.1 | 79.0 |
| 16 | Tri-n-butylamine | 50 | 0.2 | 1 | 6 | 79.8 | 10.7 | 79.0 |
| 17 | Tri-n-octylamine | 50 | 0.04 | 1 | 40 | 84.7 | 8.1 | 79.0 |
| 18 | Tri-n-octylamine | 50 | 0.05 | 1 | 24 | 80.5 | 9.7 | 79.0 |
| 19 | Tri-n-octylamine | 50 | 0.2 | 1 | 5 | 79.0 | 11.3 | 79.0 |
| 20 | Trimethylamine | 25 | 0.1 | 1 | 240 | 95.6 | 3.1 | 80.0 |
| 21 | Trimethylamine | 50 | 0.1 | 1 | 60 | 92.0 | 5.0 | 79.0 |
| 22 | Trimethylamine | 100 | 0.1 | 1 | 10 | 80.3 | 10.9 | 76.0 |
| 23 | Triethylamine | 25 | 0.1 | 1 | 240 | 97.3 | 1.5 | 80.0 |
| 24 | Triethylamine | 50 | 0.1 | 1 | 60 | 91.0 | 5.1 | 79.0 |
| 25 | Triethylamine | 100 | 0.1 | 1 | 11 | 80.0 | 10.7 | 76.0 |
| 26 | Tri-n-propylamine | 25 | 0.1 | 1 | 210 | 93.2 | 4.2 | 80.0 |
| 27 | Tri-n-propylamine | 50 | 0.1 | 1 | 55 | 88.8 | 7.0 | 79.0 |
| 28 | Tri-n-propylamine | 100 | 0.1 | 1 | 10 | 79.0 | 10.6 | 76.0 |
| 29 | Trimethylamine hydrochloride | 50 | 0.1 | 1 | 220 | 87.5 | 7.3 | 79.0 |
| 30 | Triethylamine hydrochloride | 50 | 0.1 | 1 | 250 | 86.0 | 8.2 | 79.0 |

EXAMPLE 2

$SiHCl_3$ used as the starting material in Example 1 above was changed to $SiH_2Cl_2$, and the disproportionation reaction was conducted under the conditions as shown in Table 2 below, while quantitatively measuring concentration of $SiH_4$ in the gas phase by gas chromatography. Table 2 indicates the time when the concentration of $SiH_4$ became constant and the concentration thereof at that time. Also, in Table 2 below, the equilibrated concentration of $SiH_4$ obtained by calculation is shown as a reference.

For the purpose of comparison, under the same conditions as in Example 2 above, the disproportionation reactions were conducted by using triethylamine, tri-n-propylamine and trimethylamine hydrochloride as the catalysts, at reaction temperatures of 25° C., 50° C., and 100° C., respectively. The results are shown in Table 2 below (experiments No. 42–No. 48). The experiments were carried out by use of the agitator as was the case with the above-mentioned comparative experiments No. 20–No. 30.

TABLE 2

| Experiment No. | Kind of catalyst | Reaction temp. (°C.) | Quantity of catalyst (mol) | Starting material SiH₂Cl₂ (mol) | Time lapsed until SiH₄ concentration becomes constant (min) | SiH₄ concentration when it became constant (%) | Equilibrated SiH₄ concentration (%) |
|---|---|---|---|---|---|---|---|
| 31 | Tri-n-butylamine | 50 | 0.1 | 1 | 5 | 65.5 | 66.0 |
| 32 | Tri-n-pentylamine | 50 | 0.1 | 1 | 4 | 66.3 | 66.0 |
| 33 | Tri-n-hexylamine | 50 | 0.1 | 1 | 4 | 65.9 | 66.0 |
| 34 | Tri-n-heptylamine | 50 | 0.1 | 1 | 4 | 65.9 | 66.0 |
| 35 | Tri-n-octylamine | 50 | 0.1 | 1 | 3.5 | 66.2 | 66.0 |
| 36 | Tri-n-decylamine | 50 | 0.1 | 1 | 4 | 65.8 | 66.0 |
| 37 | Tri-n-dodecylamine | 50 | 0.1 | 1 | 4 | 66.4 | 66.0 |
| 38 | Tri-n-butylamine | 25 | 0.1 | 1 | 20 | 72.5 | 73.5 |
| 39 | Tri-n-butylamine | 100 | 0.1 | 1 | 0.5 | 51.0 | 50.7 |
| 40 | Tri-n-octylamine | 25 | 0.1 | 1 | 18 | 72.2 | 73.5 |
| 41 | Tri-n-octylamine | 100 | 0.1 | 1 | 0.5 | 50.6 | 50.7 |
| 42 | Triethylamine | 25 | 0.1 | 1 | 79 | 60.3 | 73.5 |
| 43 | Triethylamine | 50 | 0.1 | 1 | 23 | 52.1 | 66.0 |
| 44 | Triethylamine | 100 | 0.1 | 1 | 12 | 39.9 | 50.7 |
| 45 | Tri-n-propylamine | 25 | 0.1 | 1 | 68 | 68.4 | 73.5 |
| 46 | Tri-n-propylamine | 50 | 0.1 | 1 | 21 | 60.5 | 66.0 |
| 47 | Tri-n-propylamine | 100 | 0.1 | 1 | 10 | 45.2 | 50.7 |
| 48 | Trimethylamine hydrochloride | 50 | 0.1 | 1 | 65 | 67.8 | 66.0 |

EXAMPLE 3

Experiments were conducted in the same manner as in experiments No. 1 and No. 5 of Example 1 except that the concentration of the hydrochloride was varied by changing the amount of the introduction of HCl. The conditions and the results are shown in Table 3. Experiments No. 49, No. 50, No. 59, No. 60 and No. 67 in Table 3 are comparative examples.

TABLE 3

| Experiment No. | Kind of catalyst | Hydrochloride content (mol %) | Reaction temp. (°C.) | Time lapsed until SiHCl₃ concentration becomes constant (min) | $SiHCl_3$ concentration (%) | $SiCl_4$ concentration (%) | Equilibrated $SiHCl_3$ concentration (%) (as calculated) |
|---|---|---|---|---|---|---|---|
| 49 | Trioctylamine | — | 50 | 12 | 80.1 | 11.2 | 79.0 |
| 50 | Trioctylamine | 1 | 50 | 11 | 79.6 | 11.0 | 79.0 |
| 51 | Trioctylamine | 2 | 50 | 7 | 78.3 | 10.5 | 79.0 |
| 52 | Trioctylamine | 5 | 50 | 7 | 79.0 | 10.8 | 79.0 |
| 53 | Trioctylamine | 10 | 50 | 6 | 78.8 | 10.4 | 79.0 |
| 54 | Trioctylamine | 20 | 50 | 6 | 79.4 | 10.9 | 79.0 |
| 55 | Trioctylamine | 30 | 50 | 6 | 79.0 | 10.9 | 79.0 |
| 56 | Trioctylamine | 40 | 50 | 6 | 78.9 | 11.5 | 79.0 |
| 57 | Trioctylamine | 80 | 50 | 6 | 78.6 | 11.7 | 79.0 |
| 58 | Trioctylamine | 80 | 50 | 6 | 76.3 | 11.9 | 79.0 |
| 59 | Trioctylamine | 85 | 50 | 6 | 72.6 | 14.9 | 79.0 |
| 60 | Tributylamine | — | 50 | 14 | 80.2 | 11.3 | 79.0 |
| 61 | Tributylamine | 1 | 50 | 13 | 80.1 | 11.1 | 79.0 |
| 62 | Tributylamine | 2 | 50 | 8 | 79.6 | 10.8 | 79.0 |
| 63 | Tributylamine | 10 | 50 | 7 | 78.3 | 10.9 | 79.0 |
| 64 | Tributylamine | 20 | 50 | 7 | 79.8 | 10.3 | 79.0 |
| 65 | Tributylamine | 30 | 50 | 6 | 78.2 | 11.9 | 79.0 |
| 66 | Tributylamine | 80 | 50 | 6 | 76.4 | 12.0 | 79.0 |
| 67 | Tributylamine | 85 | 50 | 6 | 70.6 | 17.0 | 79.0 |

As described in the foregoing, the present invention provides a chlorosilane disproportionation catalyst composed essentially of a specific tertiary amine and its hydrochloride, and a method for the disproportionation of a chlorosilane by means of the catalyst. The following effects are obtainable by the present invention.

(1) The catalyst of the present invention provides a conversion which is closer to the equilibrated conversion, at a temperature of less than 150° C. in comparison with the conventional catalyst.

(2) When the catalyst of the present invention is used, the equilibrated conversion is reached in a short period of time, which means a high disproportionation velocity, and which makes it possible to reduce the size of the reaction apparatus.

(3) The catalyst according to the present invention is completely soluble in the chlorosilane as the starting material, and also has a boiling point of 200° C. and above. Accordingly, it serves to lower the vapor pressure in the reaction liquid, and advantageously contributes to safety in the operation.

(4) The catalyst can be readily separated from the reaction product such as $SiH_2Cl_2$ or $SiH_4$.

(5) Since the reaction system is a uniform liquid phase system, there is no necessity for agitation and other homogenizing operations. Thus, the transportion and various handling of the catalyst become advantageously simple.

EXAMPLE 4

Into the evaporation tank 9, 2 liters of tri-n-octylamine was charged, and then 21 liters of hydrogen chloride gas was blown into it to prepare a catalyst containing 20 mol % of tri-n-octylamine hydrochloride. Then, the heating medium oil in the jacket was heated and maintained at a temperature of 100° C. On the other hand, the condenser 3 above the reaction tower was cooled with methanol dry ice of −60° C. The reboiler 2 at the bottom of the reaction tower was then heated by an electric heater. Trichlorosilane was continuously supplied from the starting material supply conduit 4 into the reaction tower 1 at a flow rate of 4.0 kg/hr. At the same time, the catalyst in the evaporation tank 9 was circulated to the reaction tower 1 at a flow rate of 1.07 kg/hr by the operation of the catalyst circulation pump 10. The internal pressure of the reaction tower 1 was adjusted by an adjusting valve 5 and maintained at a gauge pressure of 2 kg/cm². Also, the liquid level of the reboiler 2 was adjusted by an adjusting valve 8 so that the liquid surface was maintained at a constant level, and the reaction solution containing the catalyst in the reboiler was withdrawn to the evaporation tank 9. While supplying hydrogen chloride gas to the recovered catalyst at a flow rate of 50 cc/min through the supply line 13, the recovered catalyst was continuously recycled to the reaction tower. The reaction was continuously carried out for 20 hours while maintaining the temperature of the reboiler 2 at the bottom of the reaction tower at 85° C., whereby a low boiling gas was obtained from the top at a rate of 180 g/hr. The recovered liquid collected in the collecting tank 7 was analyzed by gas chromatography, and it was found that the recovered liquid contained 85 mol % of monosilane, 8.5 mol % of monochlorosilane and 6.5 mol % of dichlorosilane.

On the other hand, the chlorosilane evaporated from the evaporation tank 9 was cooled in the condenser 11 and recovered in the tank 12 at a rate of 3.82 kg/hr. The composition of the recovered liquid was analyzed by gas chromatography, and it was found that the liquid consisted of 48 mol % of trichlorosilane and 52 mol % of silicon tetrachloride.

EXAMPLE 5

The operation was conducted in the same manner as in Example 4 except that 2 liters of tri-n-butylamine was charged to the evaporation tank 9 and 38 liters of hydrogen chloride gas was blown into it to prepare a catalyst containing 20 mol % of tri-n-butylamine hydrochloride, and the catalyst thereby obtained was recycled to the reaction tower 1 at a flow rate of 570 g/hr. As the results, a low boiling gas was obtained from the top of the tower at a rate of 170 g/hr. The recovered liquid consisted of 81.5 mol % of monosilane, 9.5 mol % of monochlorosilane, 8.0 mol % of dichlorosilane and 1.0 mol % of trichlorosilane. On the other hand, the chlorosilane mixture evaporated from the evaporation tank 9 was cooled in the condenser 11, and recovered in the storage tank 12 at a rate of 3.83 kg/hr. The recovered liquid consisted of 55 mol % of trichlorosilane and 45 mol % of silicon tetrachloride.

EXAMPLE 6

The operation was conducted in the same manner as in Example 4 except that the condenser 3 was cooled by circulating a saline of −10° C. As the results, a gas mixture comprising 7 mol % of monosilane, 13 mol % of monochlorosilane, 66 mol % of dichlorosilane and 14% of tirchlorosilane was obtained at a rate of 950 g/hr from the condenser 3. On the other hand, the chlorosilane mixture comprising 43 mol % of trichlorosilane and 57 mol % of silicon tetrachloride was recovered at a rate of 3.05 kg/hr from the evaporation tank 9.

EXAMPLE 7

The operation was conducted in the same manner as in Example 4 except that instead of hydrogen chloride gas, steam was supplied from the line 16 of FIG. 1 at a flow rate of 30 cc/min. The yield of the low boiling gas from the top was 175 g/hr, and the composition of the gas was substantially the same as the one obtained in Example 4.

EXAMPLE 8

EXAMPLE 10

Figure 3:
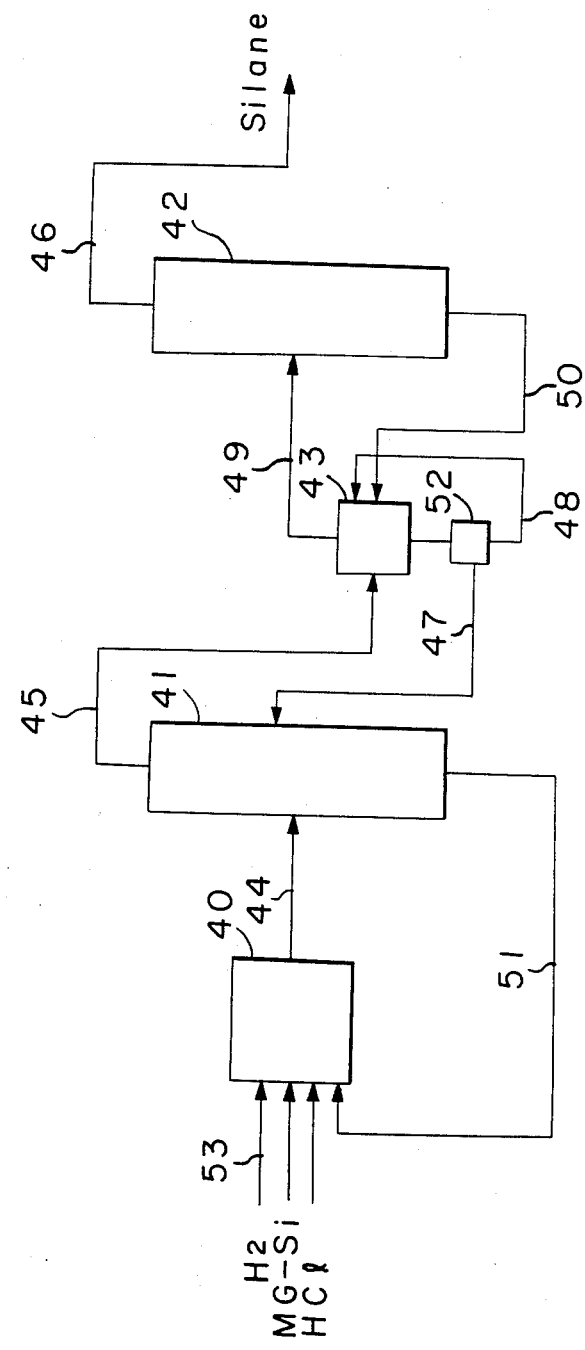
FIGS. 3 and 4 are schematic diagrams illustrating the processes for the production of the starting materials according to the Examples of the present invention.

An experiment for the production of monosilane was conducted in accordance with the flow chart shown in FIG. 3, to demonstrate the production of monosilane by the combination of the step for synthesizing trichlorosilane from silicon of methallurgical grade, hydrogen chloride, hydrogen and silicon tetrachloride, with a monosilane reaction and distillation process of Example 4.

A Hastelloy reactor having an internal capacity of 20 liters was used as the trichlorosilane synthesizing furnace 40, and operated at 600° C. under a pressure of 2 kg/cm$^2$G. The conversion of trichlorosilane in this step was 30%. The conditions for the reaction tower 43 and the evaporator 52 were the same as in Example 4.

As the results, the consumption of the starting material silicon of metallurgical grade was about 65 g/hr under a monosilane production condition of 68 g/hr. In order to show the effects of the present invention clearly, the compositions of the silane mixtures around the distillation tower 41 were measured, and the results are shown in Table 4. For the purpose of comparison, comparative experiments were conducted by using the conventional ion exchange resins under the same conditions for the production of monosilane. The temperature of the ion exchange resin bed was 60° C. The compositions of the silane mixtures around the distillation tower 21 are likewise shown in Table 4.

It is apparent from Table 4 that the amount of treatment in the distillation tower according to the present invention is about 8 kg/hr which is more than 50% less than 14 kg/hr of the comparative example. This means that the apparatus can be made compact and simplified.

TABLE 4

| Sampling position | 44 g/h | 44 mol/h | 47 g/h | 47 mol/h | 45 g/h | 45 mol/h | 51 g/h | 51 mol/h | 46 g/h | 46 mol/h |
|---|---|---|---|---|---|---|---|---|---|---|
| Example 6 | | | | | | | | | | |
| SiCl$_4$ | 4,137 | 24.3 | 1,379 | 8.1 | | | 5,517 | 32.4 | | |
| SiHCl$_3$ | 1,414 | 10.4 | 1,204 | 8.9 | 2,618 | 19.3 | | | | |
| SiH$_2$Cl$_2$ | | | | | | | | | | |
| SiH$_3$Cl | | | | | | | | | | |
| SiH$_4$ | | | | | | | | | 68 | 2.1 |
| | 5,551 | 34.7 | 2,583 | 17.0 | 2,618 | 19.3 | 5,517 | 32.4 | 68 | 2.1 |
| Sampling position | 26 g/h | 26 mol/h | 33 g/h | 33 mol/h | 27 g/h | 27 mol/h | 30 g/h | 30 mol/h | 29 g/h | 29 mol/h |
| Comparative Example | | | | | | | | | | |
| SiCl$_4$ | 4,039 | 23.8 | 1,088 | 6.4 | | | 5,127 | 30.2 | | |
| SiHCl$_3$ | 1,382 | 10.2 | 6,924 | 51.1 | 8,306 | 61.3 | | | | |
| SiH$_2$Cl$_2$ | | | 646 | 6.4 | 646 | 6.4 | | | | |
| SiH$_3$Cl | | | | | | | | | | |
| SiH$_4$ | | | | | | | | | 68 | 2.1 |
| | 5,421 | 34.0 | 8,658 | 63.9 | 8,952 | 62.7 | 5,127 | 30.2 | 68 | 2.1 |

The operation was conducted in the same manner as in Example 4 except that instead of hydrogen chloride gas, a 35% hydrochloric acid aqueous solution was supplied from the line 16 in FIG. 1 at a flow rate of 40 cc/min, whereby substantially the same results as in Example 7 were obtained.

EXAMPLE 9

The operation was conducted in the same manner as in Example 4 except that hydrogen chloride gas was supplied from the line 15 in FIG. 1 at a flow rate of 50 cc/min, whereby substantially the same results as in Example 4 were obtained.

What is claimed is:

1. A method for disproportionating at least one chlorosilane selected from the group consisting of monochlorosilane, dichlorosilane and trichlorosilane, comprising:

conducting said disproportionation in the presence of a chlorosilane disproportionation catalyst comprising (1) a tertiary amine of the formula:

wherein each R group represents an aliphatic hydrocarbon group and the sum of carbon atoms in the three aliphatic hydrocarbon groups is at least 12, and (2) a teritary amine hydrochloride of the formula:

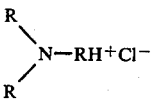

wherein R is as defined above.

2. A method for continuously producing monosilane and/or dichlorosilane by the disproportionation of trichlorosilane or dichlorosilane, which comprises:
  (a) supplying the chlorosilane starting material and a chlorosilane disproportionation catalyst comprising a tertiary amine of the formula:

wherein R represents an aliphatic hydrocarbon group and the sum of carbon atoms in the three aliphatic hydrocarbon groups is at least 12, and a tertiary amine hydrochloride of the formula:

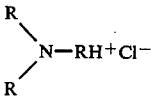

wherein R is as defined above, into a reaction tower having a distilling function;
  (b) obtaining from the top of the tower, a silane compound containing more hydrogen atoms than the chlorosilane starting material;
  (c) withdrawing, from the bottom of the tower, a liquid mixture comprising the catalyst and silane compounds containing more chlorine atoms as byproducts;
  (d) separating the silane compounds and the catalyst in the liquid mixture; and
  (e) recylcing the separated catalyst to the reaction tower.

3. The method according to claim 2, wherein the catalyst is present in an amount of from 2 to 50 mol % relative to the chlorosilane starting material.

4. The method according to claim 2, wherein the reaction tower is operated at a temperature of from 10° to 300° C. under a gauge pressure of from 0 to 40 kg/cm$^2$.

5. The method according to claim 2, wherein the chlorosilane starting material is trichlorosilane prepared by reacting metallurgical grade silicon metal, hydrogen, hydrogen chloride and silicon tetrachloride, followed by distillation.

6. The method according to claim 2, wherein the chlorosilane starting material is trichlorosilane prepared by reacting silica, carbon and chlorine gas thereby forming silicon tetrachloride, condensing the formed silicon tetrachloride gas and subjecting it to distillation to remove low and high boiling components, followed by reduction with hydrogen to convert the silicon tetrachloride to trichlorosilane.

7. The method according to claim 1, wherein the tertiary amine catalyst is tri-n-butylamine, tri-n-pentylamine, tri-n-hexylamine, tri-n-heptylamine, tri-n-octylamine, tri-n-decylamine or tri-n-dodecylamine.

8. The method according to claim 1, wherein the sum of the carbon atoms in all three groups ranges from 12 to 36.

* * * * *